(12) United States Patent
Fan et al.

(10) Patent No.: US 10,080,104 B2
(45) Date of Patent: Sep. 18, 2018

(54) LOCATION BASED SERVICES USING LOCATION AND MOTION INFORMATION

(71) Applicant: INTERNATIONAL BUSINESS MACHINES CORPORATION, Armonk, NY (US)

(72) Inventors: Si Bin Fan, Beijing (CN); Zhi Lin Hu, Ningbo (CN); Shi Wen Li, Ningbo (CN); Zheng He Yang, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/802,767

(22) Filed: Jul. 17, 2015

(65) Prior Publication Data

US 2017/0019767 A1    Jan. 19, 2017

(51) Int. Cl.
*H04W 24/00* (2009.01)
*H04W 4/02* (2018.01)

(52) U.S. Cl.
CPC .......... *H04W 4/027* (2013.01); *H04W 4/023* (2013.01); *H04W 4/026* (2013.01)

(58) Field of Classification Search
None
See application file for complete search history.

(56) References Cited

U.S. PATENT DOCUMENTS

| | | | |
|---|---|---|---|
| 6,564,143 B1 * | 5/2003 | Alewine | G01C 21/26 342/357.31 |
| 6,754,485 B1 * | 6/2004 | Obradovich | G01C 21/26 340/286.14 |
| 7,756,534 B2 | 7/2010 | Anupam et al. | |
| 7,818,016 B2 | 10/2010 | Ahn | |
| 8,700,302 B2 | 4/2014 | Khosravy et al. | |
| 2002/0052674 A1 * | 5/2002 | Chang | G06F 17/3087 700/300 |
| 2009/0319605 A1 | 12/2009 | Wirola et al. | |
| 2011/0071757 A1 * | 3/2011 | Lee | G01C 21/20 701/532 |

(Continued)

FOREIGN PATENT DOCUMENTS

EP        1429576 B1    3/2006

OTHER PUBLICATIONS

Method for Implementation of a Location, Direction, Speed Based Smarter Notification Service, Dec. 3, 2013, IP.com No. 000233241.

*Primary Examiner* — German Viana Di Prisco
(74) *Attorney, Agent, or Firm* — Isaac J. Gooshaw, Esq.; George S. Blasiak, Esq.; Heslin Rothenberg Farley & Mesiti, P.C.

(57) ABSTRACT

In one embodiment, a method includes: obtaining location information and motion information of a wireless communication apparatus, and a data set from one or more information sources external to the wireless communication apparatus; and organizing data of the data set for display, where the organizing is based on the location and motion information of the wireless communication apparatus. Methods of other embodiments may also include defining a search radius based on the location information and motion information of the wireless communication apparatus, and the organizing may also include filtering the data set from the one or more information sources to exclude data from information sources outside the defined search radius.

20 Claims, 13 Drawing Sheets

(56) References Cited

U.S. PATENT DOCUMENTS

2012/0129553 A1    5/2012  Phillips et al.
2015/0208130 A1*  7/2015  Ishii ...................... G01C 21/34
                                              386/297

* cited by examiner

LOCATION BASED SERVICES USING LOCATION AND MOTION INFORMATION

TECHNICAL FIELD

The present disclosure relates to location based services (LBS), and more particularly to organizing data from information sources based on location and motion information of wireless communication apparatuses.

BACKGROUND

Location Based Services (LBS) may be used in a wide variety of contexts to provide location-based information to end users via wireless communication devices, such as a mobile phone, a GPS apparatus, and so on. Users may get information from an LBS to search for, for example, nearby restaurants, show times at local theaters, sales at shopping centers within a specific distance, and more, based on a current location of the wireless communication apparatus.

However, many current Location Based Services do not provide end users with the most relevant or useful search results. Many services are configured to give end users search results within a particular distance from the end user's current location, using only the location of the wireless communication apparatus to get search results. The results may not inform the end user as to which search results are the easiest to reach, which ones coincide with the end user's travel direction, and so on. Thus, many of the results returned to the end user may not be useful or relevant, and it may be difficult for the end user to choose a particular destination that meets his or her immediate needs.

SUMMARY

Shortcomings of the prior art are overcome and additional advantages are provided through the provision, in one aspect, of a method. The method includes obtaining, by one or more processors, location information and motion information of a wireless communication apparatus, and a data set from one or more information sources external to the wireless communication apparatus. The method further includes organizing, by the one or more processors, data from the data set for display, where the organizing is based on the location and motion information of the wireless communication apparatus. The method may advantageously organize data of the data set for an end user to provide the end user with more relevant and useful data, for example, at the beginning of an organized list of data of the data set.

In one embodiment, the location information or motion information was updated at the wireless communication apparatus prior to the obtaining. This may, for example, advantageously provide an end user with up-to-date data from information sources automatically as the end user's wireless communication apparatus moves from one location to another.

In another embodiment, the method may include acquiring a user request, and the obtaining may be performed in response to acquiring the user request. This may, for example, advantageously provide an end user with up-to-date data from information sources at any time the end user chooses to receive updated data.

In another embodiment, the motion information may include one or more of a speed of the wireless communication apparatus, a direction of motion of the wireless communication apparatus, an average speed of the wireless communication apparatus, and a pattern of motion of the wireless communication apparatus. For example, including the direction of motion of the wireless communication apparatus may organize data of the data set so that information sources that are in the direction of motion are put higher in an organized list of results, while information sources in the opposite direction are put lower in the organized list (or excluded from the list altogether).

In another embodiment, the method may also include defining a search radius based on the location information and motion information of the wireless communication apparatus. Organizing the data may also include filtering the data from the one or more information sources so that data from information sources outside the defined search radius gets excluded. This may, for example, advantageously define a search radius size that is appropriate for an end user's mode of travel, such as a smaller radius for walking versus a larger radius for driving on a high-speed freeway.

In another embodiment, the search radius may be defined by one or more of an average speed of the wireless communication apparatus, a pattern of motion of the wireless communication apparatus, and traffic information associated with the location information of the wireless communication apparatus. For example, defining the search radius according to an average speed of the wireless communication apparatus may appropriately define a large radius for an apparatus with a high average speed (e.g., a wireless communication apparatus in a moving vehicle) or a small radius for an apparatus with a low average speed (e.g., being carried by a pedestrian).

In another embodiment, the method may also include obtaining a user-defined search radius parameter. The search radius may be further defined by the user-defined search radius parameter. For example, instead of relying on an automatically calculated search radius, an end user may manually define an advantageous search radius.

In another aspect, a computer program product is provided. The computer program product may include a computer readable storage medium readable by one or more processing apparatus and instructions stored on the computer readable storage medium for execution by the one or more processing apparatus. The instructions may be instructions for performing a method that includes obtaining, by one or more processor, location information and motion information of a wireless communication apparatus, as well as a data set from one or more information sources external to the wireless communication apparatus. The method also includes organizing, by the one or more processor, data from the data set for display, where the organizing is based on the location and motion information of the wireless communication apparatus.

In a further aspect, a computer system is provided. The computer system may include a memory, one or more processing apparatus in communication with the memory, a computer readable storage medium and one or more programs stored on the computer readable storage medium and including program instructions that are executable by the one or more processing apparatus, via the memory, to perform a method. The method includes obtaining, by one or more processor, location information and motion information of a wireless communication apparatus, as well as a data set from one or more information sources external to the wireless communication apparatus. The method also includes organizing, by the one or more processor, data from the data set for display, where the organizing is based on the location and motion information of the wireless communication apparatus.

Additional features and advantages are realized through the techniques set forth herein. Other embodiments and aspects are described in detail herein and are considered a part of the claimed disclosure.

BRIEF DESCRIPTION OF THE DRAWINGS

One or more aspects of the present disclosure are particularly pointed out and distinctly claimed as examples in the claims at the conclusion of the specification. The foregoing and other objects, features, and advantages of the present disclosure are apparent from the following detailed description taken in conjunction with the accompanying drawings in which:

DETAILED DESCRIPTION

Figure 1:
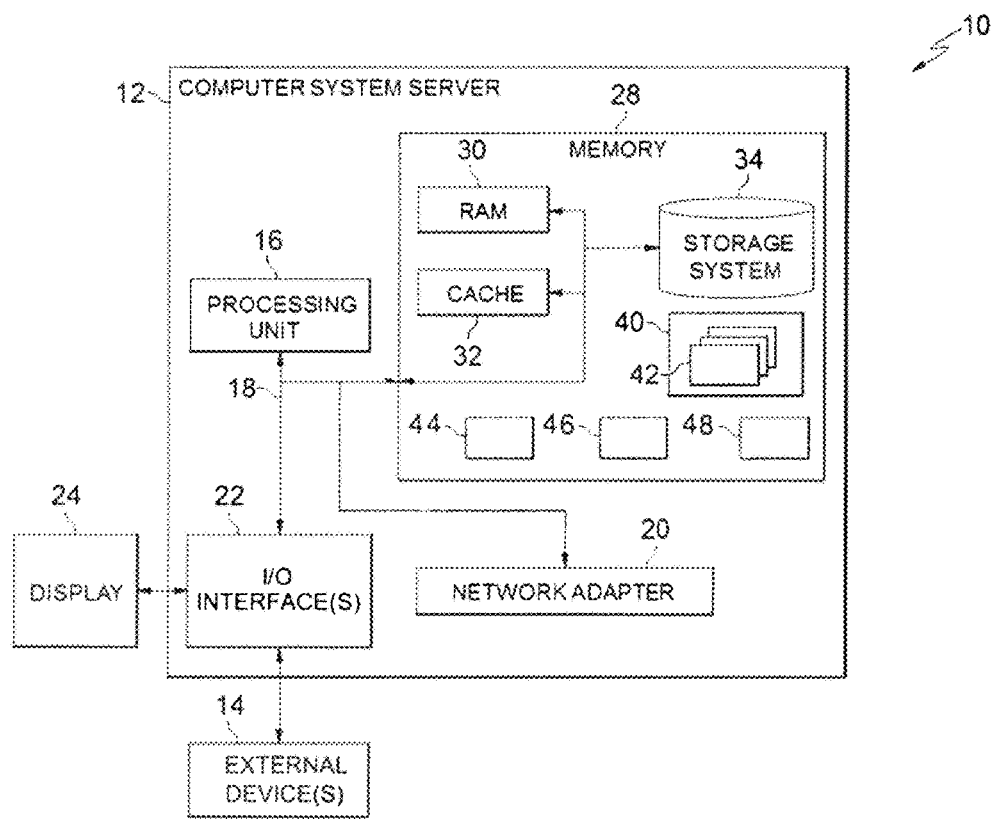
FIG. 1 depicts a cloud computing node, in accordance with one or more aspects set forth herein.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects described herein, are given by way of illustration only, and not by way of limitation. Various substitutions, modifications, additions, and/or arrangements, within the spirit and/or scope of the underlying concepts will be apparent to those skilled in the art from this disclosure.

Location Based Services (LBS) may be used in a wide variety of contexts to provide location-based information to end users via wireless communication apparatuses, such as, by way of example only, a mobile phone, a GPS apparatus, and so on. Users may obtain information or data via an LBS to find geographically relevant information sources, such as, by way of example only, nearby restaurants, show times at local theaters, sales at shopping centers, and more. Generally, data from one or more information sources may be organized for display, for example, to an end user of the wireless communication apparatus. Organization of the data may not, however, present data for display in a way that is most useful or relevant to an end user. For example, an end user traveling along a highway may want to find hotels within ten miles. An LBS may obtain the traveler's position from a wireless communication apparatus and return to the end user a list of all hotels within a ten mile radius of the vehicle. However, the results may not only include hotels within ten miles along the driver's travel direction, which are the most useful and relevant results, they may also include hotels ten miles in the opposite direction, hotels within ten miles in areas that may be difficult to access from the highway being traveled, and so on. As a result, the end user may be provided with a list of hotels in which the least useful information is presented first in a list of results, with information that is most useful and relevant possibly presented lower in a list.

Advantageously, the techniques presented herein provide improved techniques for location based services that may take into account both location information and motion information of a wireless communication apparatus to better organize search results for an end user according to the location and motion information obtained from the wireless communication apparatus.

The present disclosure provides, in part, methods, computer programs, computer systems, and/or network devices that may address one or more issues described above, and that may obtain, by one or more processor, location information and motion information of a wireless communication apparatus, and a data set from one or more information sources external to the wireless communication apparatus; and that may organize, by the one or more processor, data of the data set for display, the organizing based on the location and motion information of the wireless communication apparatus.

Reference is made below to the drawings, which are not drawn to scale for ease of understanding, wherein the same reference numbers used throughout different figures designate the same or similar components.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
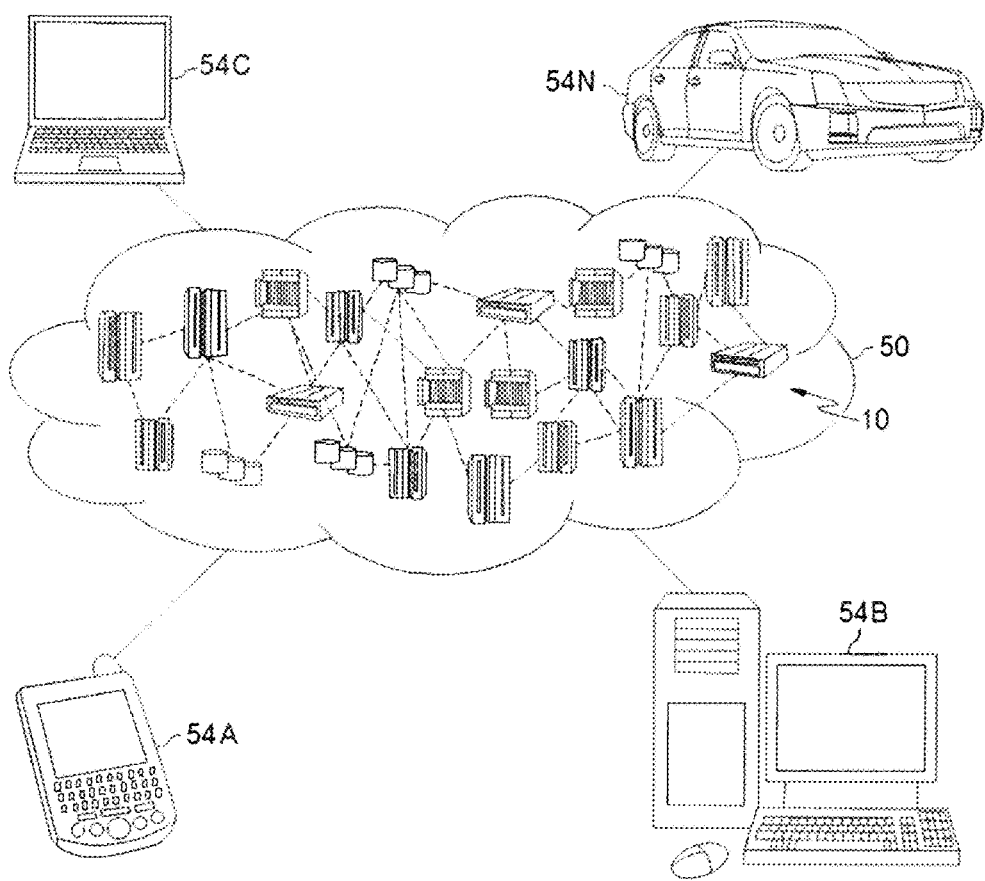
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
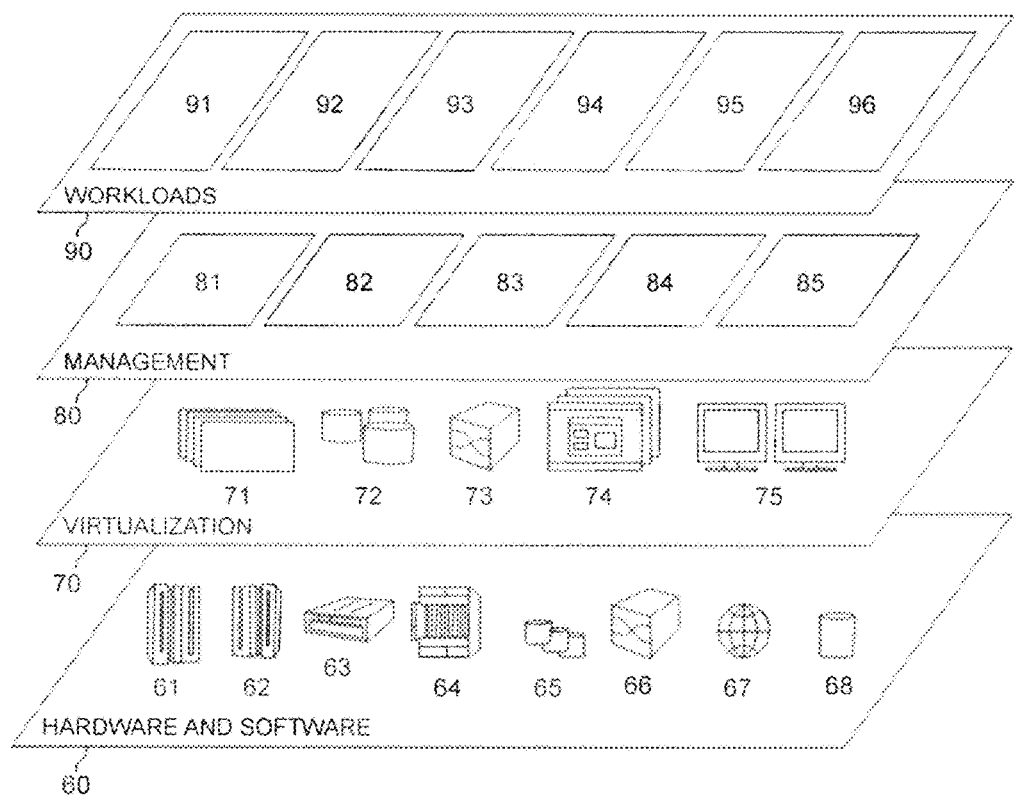
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and location based services 96 as described herein.

Figure 4:
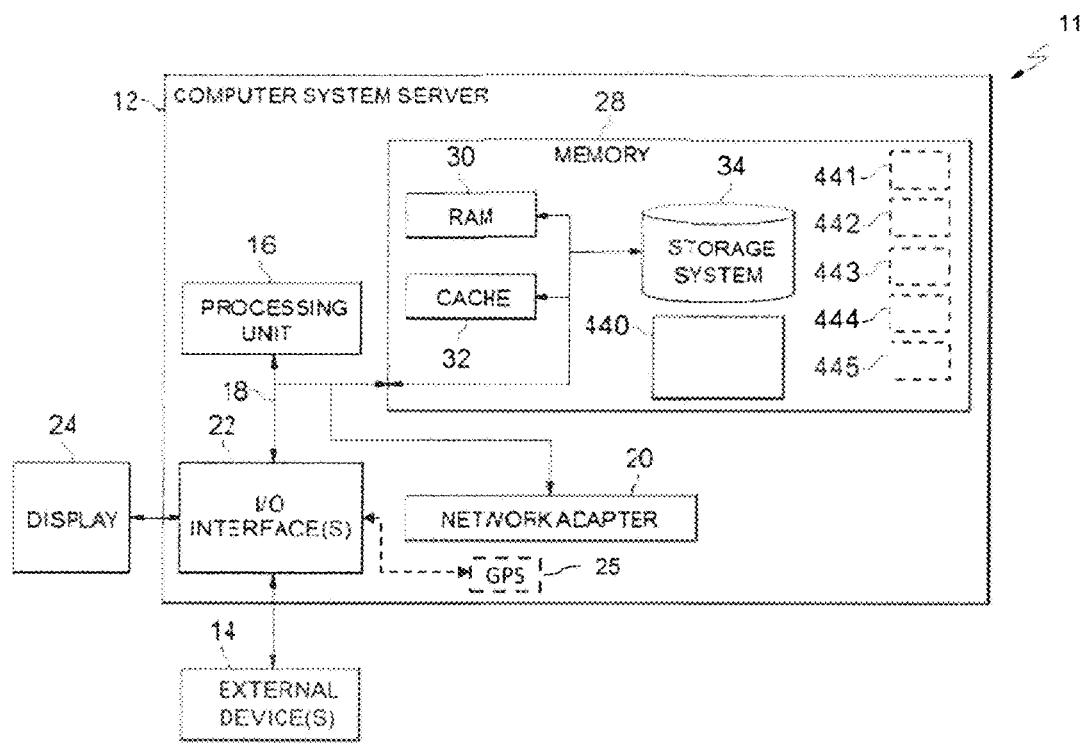
FIG. 4 depicts a hardware overview of a computing node, in accordance with one or more aspects set forth herein.

FIG. 4 depicts a hardware overview of a computing node 11, which may be a cloud computing node 10, an information source, a wireless communication apparatus, and/or a computer system, in accordance with one or more aspects set forth herein.

Program/utility 40 as set forth in FIG. 1 provides the functionality of location based services 96 and can include one or more program 440 as set forth in FIG. 4, and program/utility 40 can optionally include some or all of one or more program 441, 442, 443, 444, 445. Additionally, computer system/server 12 may communicate with one or more external devices 14, a display 24, and a GPS device 25 via Input/Output (I/O) interfaces 22.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441, 442, 443, 444, 445) generally carry out the functions and/or methodologies of embodiments of the invention as described herein.

Referring again to FIG. 4:

The present invention may be a system such as a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
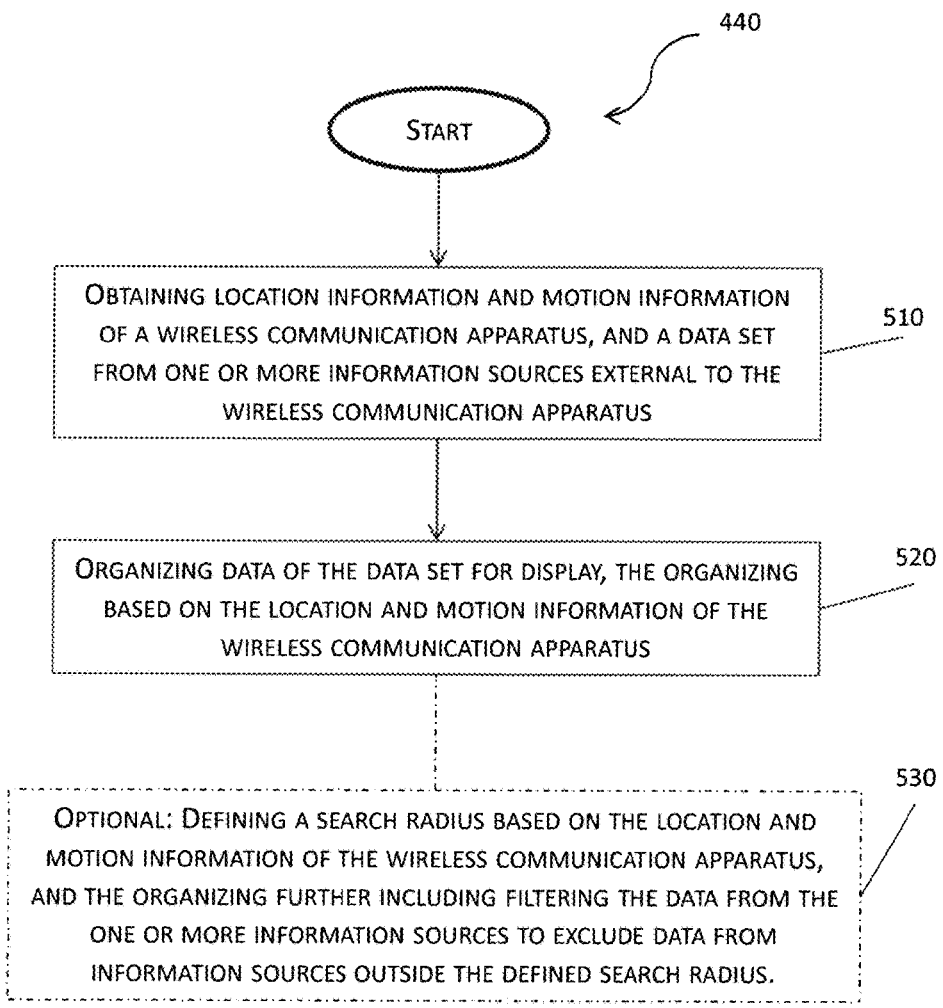
FIG. 5 depicts a workflow, in accordance with one or more aspects set forth herein.

FIG. 5 depicts a workflow, in accordance with one or more aspects set forth herein. By way of example, the processes described with respect to FIG. 5 can be performed using one or more program 440 on one or more computing node 10 or one or more computing node 11 as detailed with respect to FIGS. 1-4.

In the embodiment of FIG. 5, one or more program 440 at block 510 obtains, at one or more processors 16, location information and motion information of a wireless communication apparatus, and data from one or more information sources external to the wireless communication apparatus; and one or more program 440 at block 520 organizes the data for display, the organizing based, in part, on the location and motion information of the wireless communication apparatus. For instance, one or more program 440 at block 510 may obtain location and motion data of the wireless communication apparatus that may include one or more of a speed of the wireless communication apparatus, a direction of motion of the wireless communication apparatus, an average speed of the wireless communication apparatus, and a pattern of more of the wireless communication apparatus.

In one embodiment, one or more program 440 may optionally, at block 530, define a search radius based, in part, on the location and motion information of the wireless communication apparatus, and the organizing at block 520 may further include filtering the data from the one or more information sources to exclude data from information sources outside the defined search radius. Defining a search radius at block 530, for example, may further include defining the search radius based on one or more of an average speed of the wireless communication apparatus, a pattern of motion of the wireless communication apparatus, and traffic information associated with the location information of the wireless communication apparatus.

Figure 6A:
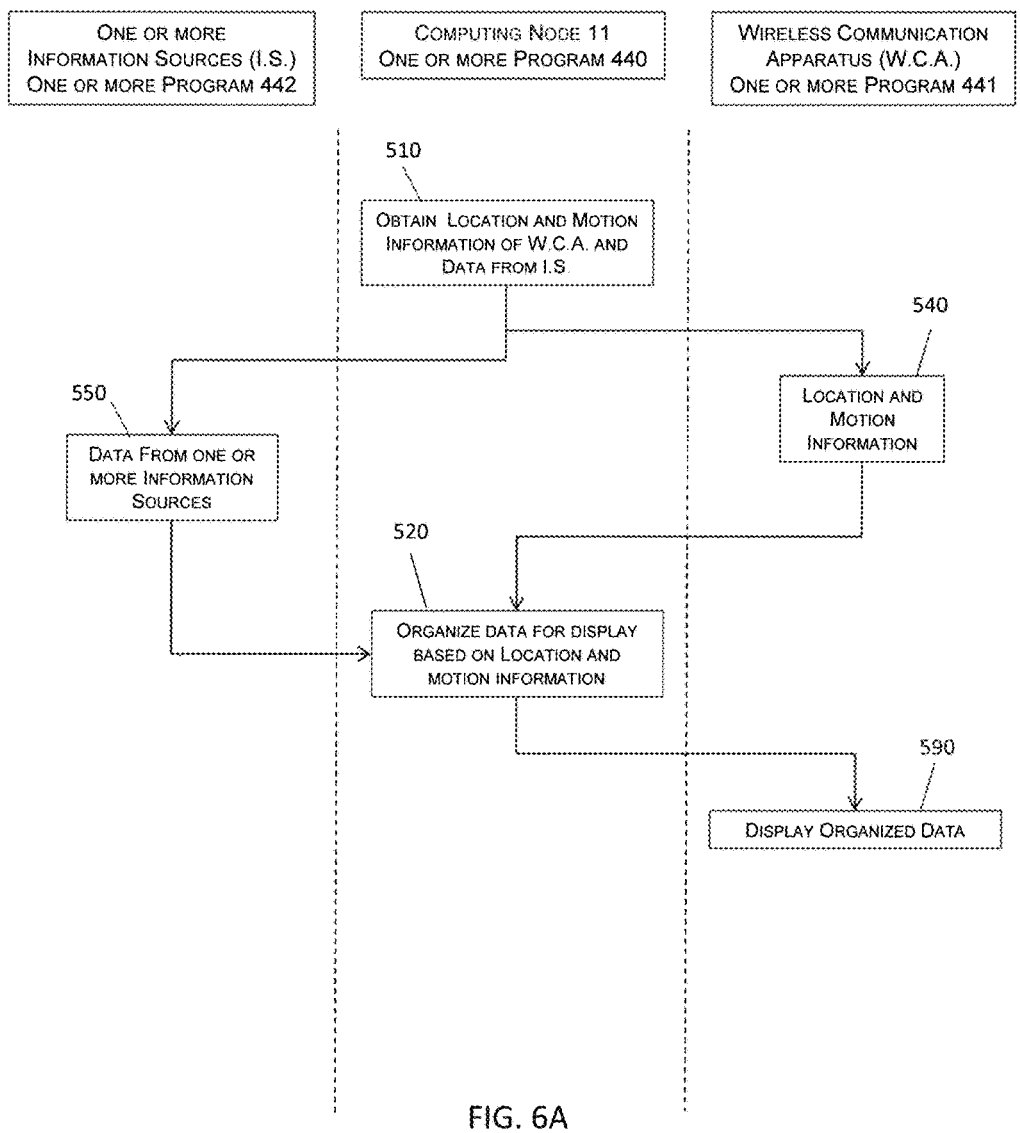
FIGS. 6A-6G depict exemplary embodiments of the process depicted in FIG. 5.

FIGS. 6A-6G depict exemplary embodiments of the process depicted in FIG. 5. By way of explanation, in FIGS. 6A-6G, processes are illustrated from the point of view of a computing node 11 one or more program 440, a wireless communication apparatus (W.C.A.) one or more program 441, and one or more information source (I.S.) one or more program 442. In one embodiment, one or more program 440 runs on one or more processor of computing node 11 as further illustrated in the examples of FIGS. 1-4. In another embodiment, one or more program 440 runs on one or more processor of a wireless communication apparatus. In other embodiments, various programs can run on a different complement of devices. For example, in one embodiment, one or more program 440 and one or more program 441 can both run on a wireless communication apparatus, a computer system, or other combinations of different devices. FIG. 6A illustrates location based services as described, in part, in FIG. 5. FIGS. 6B-6G elaborate on FIG. 6A, providing additional variant embodiments of one or more programs 440, 441, and/or 442. It may be understood that the variant embodiments are not limiting, and additional embodiments may include combinations of any one or more of embodiments illustrated by FIGS. 6B-6G, as well as additional alternative embodiments.

FIG. 6A illustrates location based services including a computing node 11 one or more program 440. One or more program 440 running on a computing node 11 at block 510 obtains, by one or more processor 16, location information and motion information of a wireless communication apparatus, and data from one or more information sources external to the wireless communication apparatus. One or more program 440 may obtain location information and motion information 540 from wireless communication apparatus one or more program 441. Similarly, data from one or more information sources may be obtained 550 from one or more information sources one or more program 442. One or more program 440 may organize the data from the one or more information sources 520 for display. The organizing may be based on the location information and motion information of the wireless communication apparatus. Organized data may be displayed 590, for example, on wireless communication apparatus running one or more program 441.

Location and/or motion information of a wireless communication apparatus obtained at block 510 may be determined by one or more of several processes for determining location and/or motion information. For example, obtaining at block 510 may include using a Global Positioning System (GPS), including using one or more GPS devices running GPS software. The wireless communication apparatus, for example, may include a GPS device running GPS software, and may communicate with other external GPS devices to determine a location of the wireless communication apparatus. Motion information may be determined, for example, by obtaining location data at defined time intervals over a defined period of time and calculating a motion of the wireless communication apparatus based on changes in location data over time. Motion information may, in other examples, be determined separately from location information. As described above, computing node 11 may include one or more GPS device 25 running GPS software, so that computing node 11 may, in one example, include one or more external GPS devices used to determine a location and/or motion of the wireless communication apparatus. In another example, for instance in embodiments in which computing node 11 is a cloud computing node 10, an external GPS device running GPS software may communicate location and/or motion information to wireless communication apparatus running one or more program 441, and computing node 11 running one or more program 440 may obtain location and motion information from wireless communication apparatus. In another example, obtaining at block 510 may include triangulation or trilateration to determine location and/or motion information of a wireless communication apparatus. In such an example, differences in signal delay, such as radio signals broadcast by wireless network towers and/or wireless communication apparatuses, may be used to determine a location of a wireless communication apparatus. Other processes for determining location and motion information of a wireless communication apparatus may also be possible, and any may be used with the methods, computer program products, and computer systems disclosed herein.

Motion information obtained at block 510 may include one or more of a speed of the wireless communication apparatus, a direction of motion of the wireless communication apparatus, an average speed of the wireless communication apparatus, and a pattern of motion of the wireless communication apparatus. Location information or motion information obtained at block 510 may further include a current location of the wireless communication apparatus, and may include traffic information. Motion and location information for the wireless communication apparatus may include other information and is not limited to any one type of information or combination of different types of information.

Motion and/or location information obtained at block 510 may be used to organize, at block 520, data from the one or more information sources. The organizing may include, for example, sorting the data into a list for display, which may be displayed, for example, on the wireless communication apparatus. The organizing may, in one embodiment, use one or more types of motion and location information to determine a score, such as a relevancy score, that may facilitate one or more program 440 determining a sort order for the data in the list for display. For example, in one embodiment, the motion information may include a direction of motion of the wireless communication apparatus. Data from information sources that are upcoming in the direction of motion may be determined by one or more program 440 to have a high relevancy or relevancy score, while data from information sources that are in different directions, and particularly opposite the direction of motion, may be determined to have a lower relevancy or relevancy score. The data may be sorted according to relevancy or relevancy score, so that data from the upcoming information sources, such as restaurants and hotels along the direction of motion, is presented at or near the top of a list that is displayed. On the other hand, data from information sources opposite the direction of motion, such as restaurants and hotels that have already been passed by, is presented lower in the list. In one example, data from information sources with a low relevancy score may be filtered so as to be excluded from being displayed.

In another embodiment, the motion information may include a speed of the wireless communication apparatus. Speed of the wireless communication apparatus may also be used by one or more program 440 to determine a score, such as a relevancy score, that may facilitate determining a sort order for the data in the list for display. For example, a high speed value, such as a vehicle speed on a highway, may be used, in one embodiment, to determine a higher relevancy for data from information sources that are within a certain driving distance, while determining a lower relevancy score for data from information sources that are very nearby or about to be passed at the measured high speed. In another embodiment, the motion information may include an average speed of the wireless communication apparatus.

In another embodiment, the location or motion information may include traffic information. The traffic information may be obtained from one or more information sources, a computing node 11 running one or more program 440, or another source. Traffic information may also be used by one or more program 440 to determine a score, such as a relevancy score, that may facilitate determining a sort order for the data in the list for display. For example, data from a first information source near to the wireless communication apparatus that is found to be along a route blocked by heavy traffic, such as traffic caused by construction work, may be determined to have a low relevancy score. Conversely, data from a second information source further away from the wireless communication apparatus may be determined to have a higher relevancy score if there is little traffic found along a route to that information source.

Figure 6B:
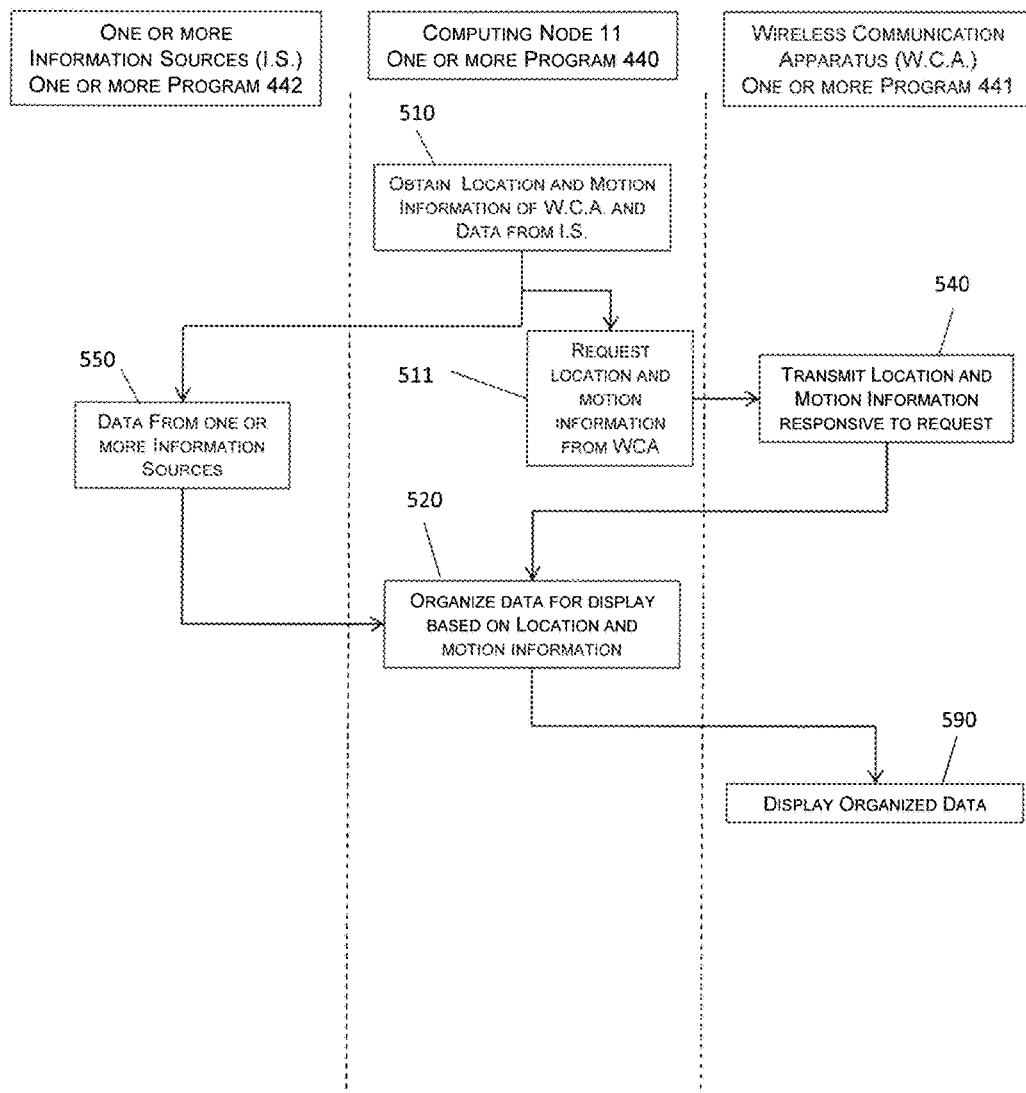

FIG. 6B illustrates one exemplary embodiment of a location based service including a computing node 11 one or more program 440. In the embodiment illustrated, obtaining location and motion information of the wireless communication apparatus may include requesting location and motion information from the wireless communication apparatus 511. In this example, computing node 11 running one or more program 440 may be configured to send or transmit requests for location and motion information to a wireless communication apparatus running one or more program 441. One or more program 441 may be configured to respond to requests for location and motion information and send or transmit information to computing node 11. In this example, one or more program 440 may be considered to actively control obtaining location and motion information of the wireless communication apparatus.

Figure 6C:
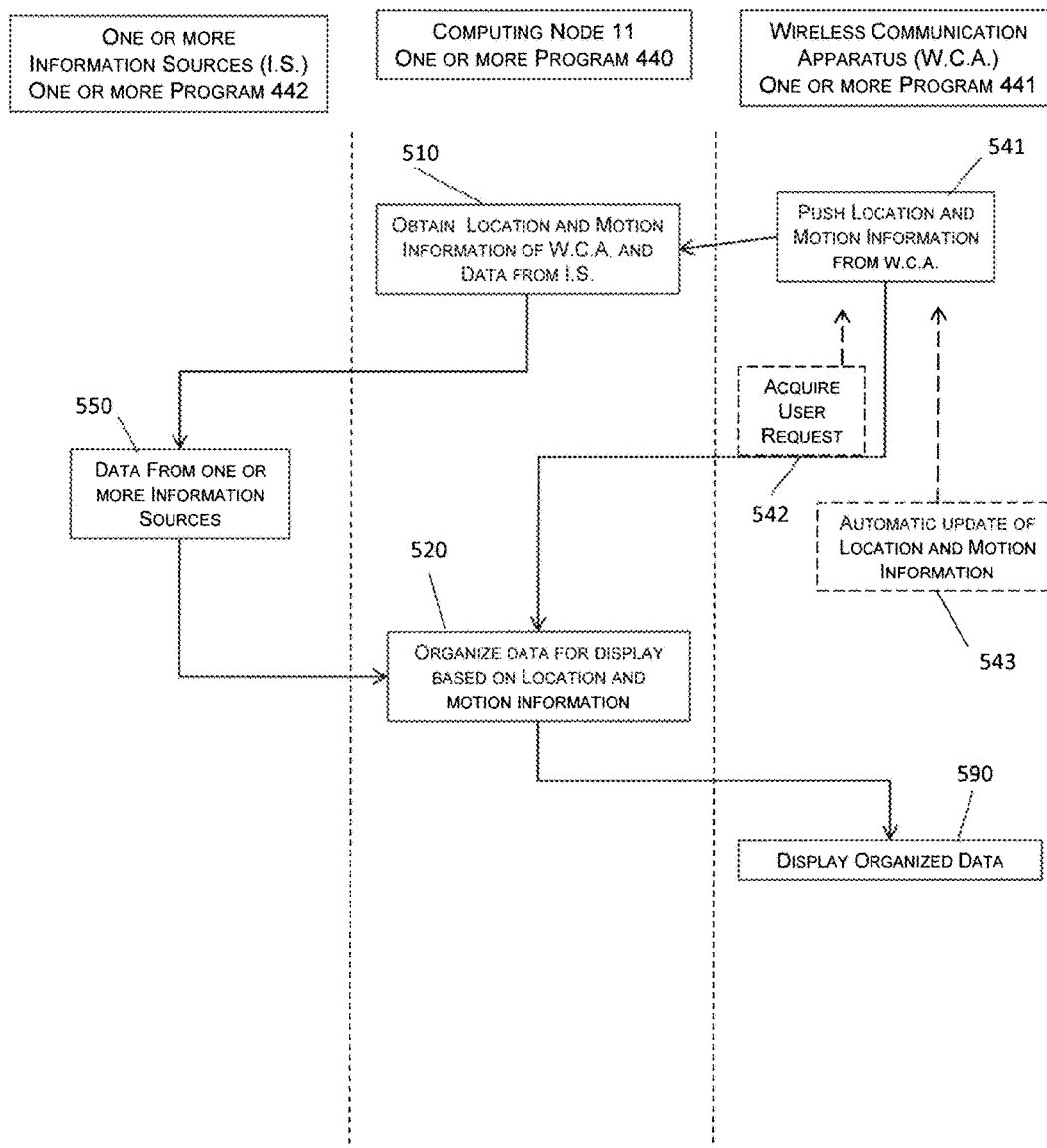

FIG. 6C illustrates another exemplary embodiment of a location based service including a computing node 11 one or more program 440. In the embodiment illustrated, obtaining location and motion information of the wireless communication apparatus may include one or more program 441 running on wireless communication apparatus pushing location and motion information from the wireless communication apparatus 541 to computing node 11 one or more program 440. In this example, one or more program 440 may be considered to passively obtain location and motion information of the wireless communication apparatus due to the wireless communication apparatus one or more program 441 controlling sending of location and motion information. In one example, pushing location and motion information from the wireless communication apparatus 541 may include automatically updating location and motion information 543 of the wireless communication apparatus. In this example, the obtaining at block 510 and organizing at block 520 may occur responsive to the automatic update of the location and motion information 543. In another example, pushing location and motion information from the wireless communication apparatus 541 may include acquiring a user request 542. For instance, one or more program 441 may allow a user to manually determine when to push location and motion information from the wireless communication apparatus to receive updated data from information sources running one or more program 442. Obtaining at block 510 and organizing at block 520 may occur responsive to acquiring a user request 542.

Figure 6D:
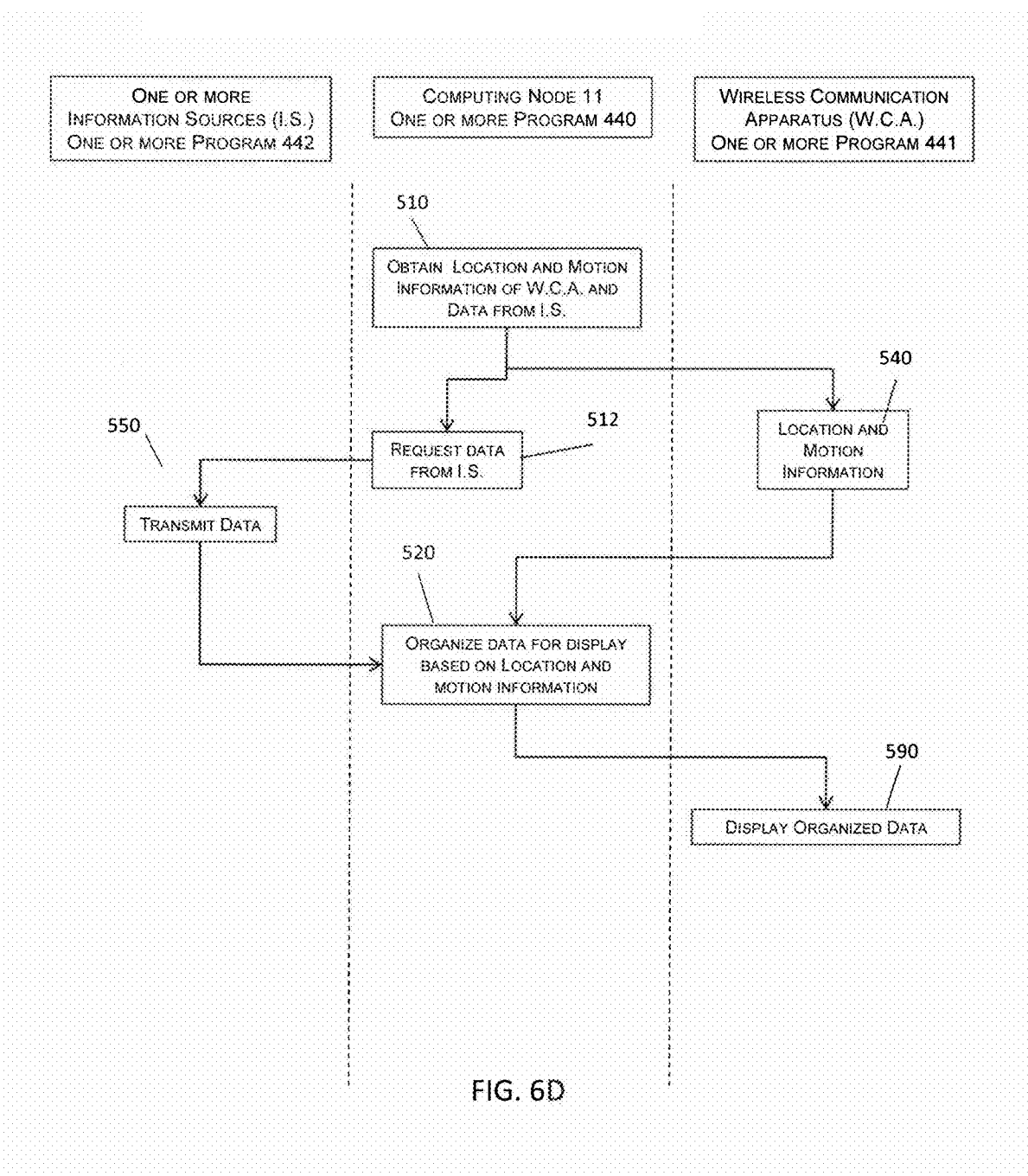

FIG. 6D illustrates another exemplary embodiment of a location based service including a computing node 11 one or more program 440. In the embodiment illustrated, obtaining data from one or more information sources 510 may include one or more program 440 requesting data from information sources 512. In this example, computing node 11 one or more program 440 may request data from any device, system, or apparatus that has the requisite data for any one or more information sources. For example, data from one or more information sources may reside on a remote or dedicated server apparatus. In another instance, data from one or more information sources may reside in a cloud computing environment, such as described in FIGS. 1-4. In yet another instance, data from one or more information sources may reside on a computing node as further illustrated in FIG. 1 and/or FIG. 4. Data from one or more information sources may include, but may not be limited to, address information, telephone or other contact information, one or more links to one or more websites, advertisements for one or more information sources, and so on.

Figure 6E:
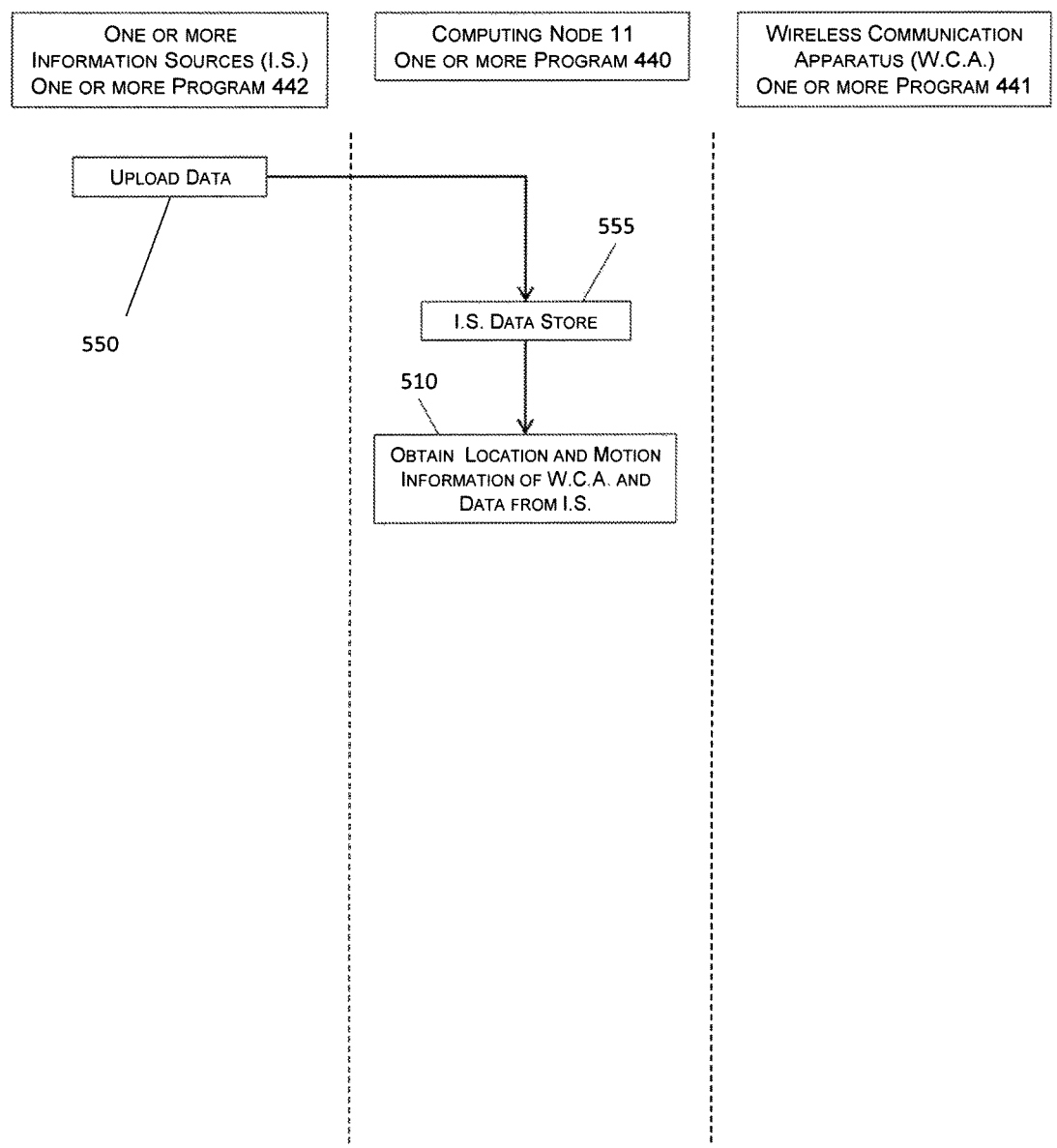

FIG. 6E illustrates yet another exemplary embodiment of a location based service including a computing node 11 one or more program 440. In the embodiment illustrated, obtaining data from one or more information sources 510 may include one or more information sources one or more program 442 uploading data from the one or more information sources to computing node 11 running one or more program 440. Uploading data may, for example, result in or add to an information source data store 555 on computing node 11 running one or more program 440. Obtaining data from one or more information sources 550 may include obtaining the data from the information source data store 555.

Figure 6F:
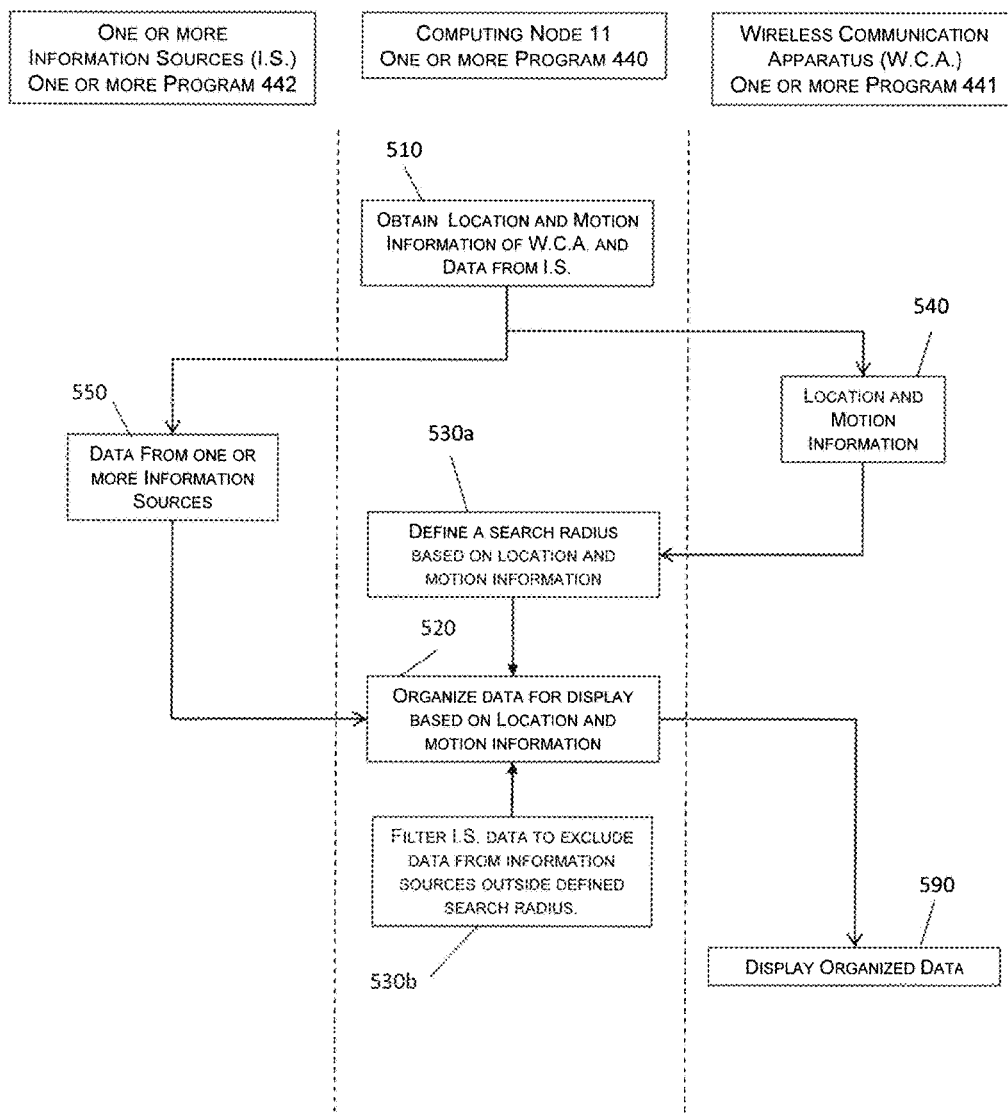

FIG. 6F illustrates another exemplary embodiment of a location based service including programming block 530 as depicted in FIG. 5. In the embodiment illustrated, computing node 11 one or more program 440 defines, at block 530a, a search radius based on the location and motion information of the wireless communication apparatus. A search radius defined at block 530a may be defined, for example, by one or more of an average speed of the wireless communication apparatus and a pattern of motion of the wireless communication apparatus. The search radius may also be defined by traffic information associated with the location information of the wireless communication apparatus. Traffic information may be obtained, for example, from a GPS service, a cloud-based service, or from any other service or source, or combination of services and sources, that may provide information about traffic and traffic conditions of a location. Organizing data for display, at block 520, may also include filtering the data set from the information sources, at block 530b, to exclude data of the data set for information sources outside the defined search radius. It may be understood that defining a search radius at block 530a and filtering at block 530b need not be performed in the order depicted, and other embodiments for implementing the defining of a search radius and filtering the data set may be possible.

Figure 6G:
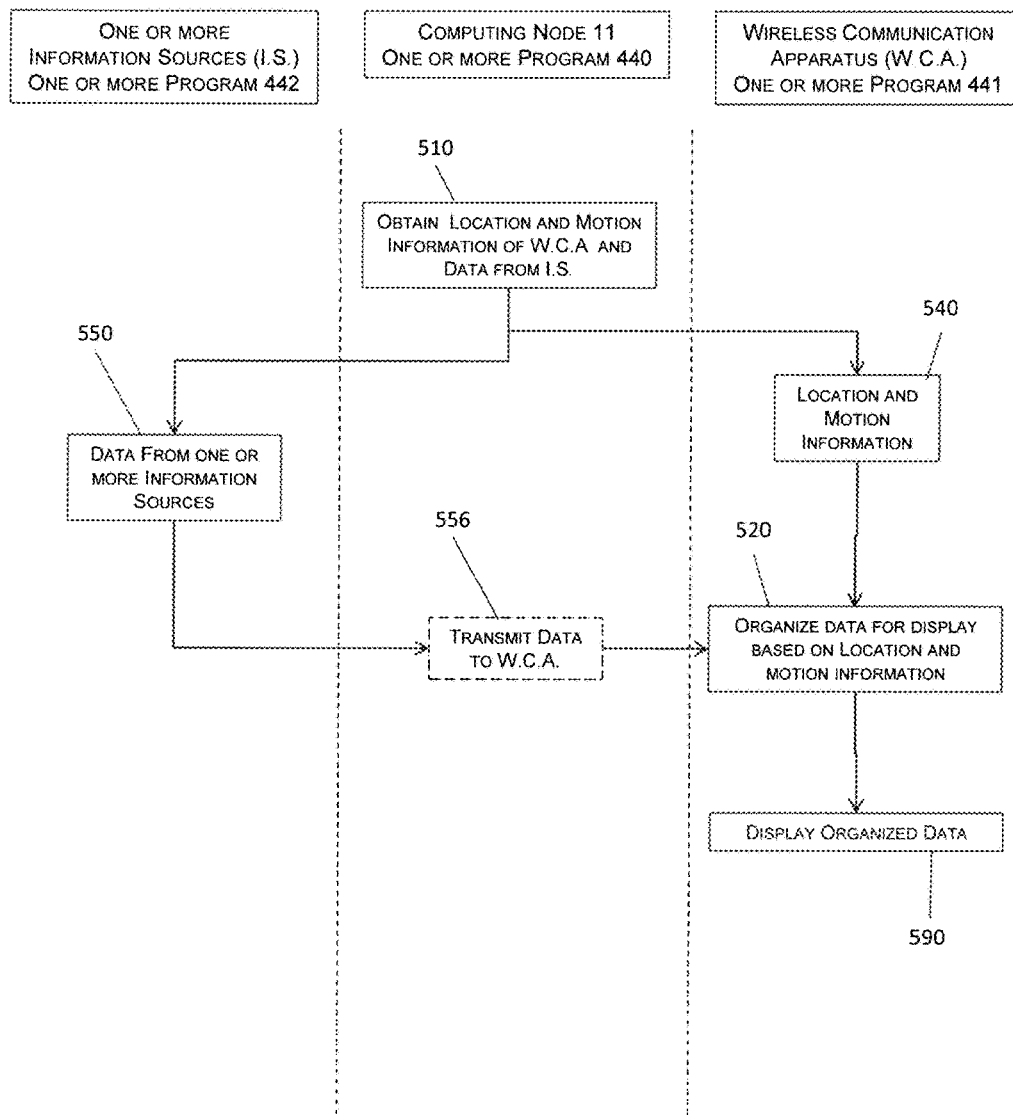

FIG. 6G illustrates an alternative embodiment of a location based service including computing node 11 one or more program 440. In the example embodiment illustrated, organizing data from one or more information sources 520 may be performed by one or more program 440 running on computing node 11 or 441 running on a wireless communication apparatus. In the example illustrated, data from one or more information sources 550 may be transmitted 556 to wireless communication apparatus running one or more program 440, or one or more program 441 via computing node 11 running one or more program 440, or transmitted 556 directly from the one or more information sources running one or more program 442, or a combination of both.

Figure 7:
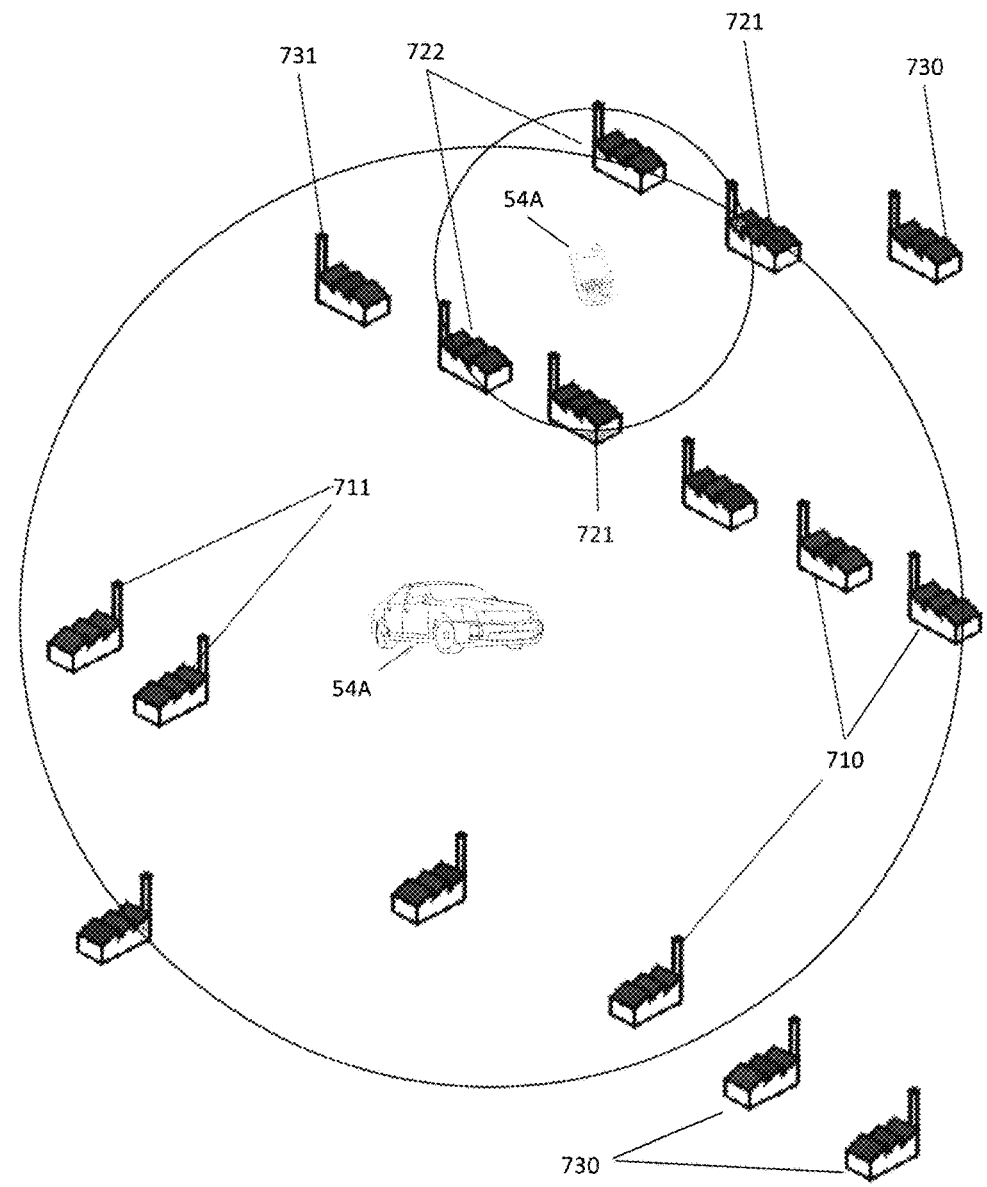
FIG. 7 depicts examples of the processes described in FIGS. 5 and 6A-6G in practice.

FIG. 7 depicts examples of the processes described in FIGS. 5 and 6A-6G in practice. FIG. 7 depicts examples of wireless communication apparatuses 54A and/or vehicles 54N carrying wireless communication apparatuses 54A, and several information sources 710, 711, 721, 722, 730, 731. One example of a wireless communication apparatus may be a mobile device 54A, such as a mobile phone or personal data assistant. Motion information obtained by one or more program 440 for mobile device 54A may include a relatively low speed, a direction of motion and a pattern of motion with few changes, and a relatively low average speed. The low average speed and the pattern of motion, as well as other obtained information obtained by one or more program 440, may indicate that mobile device 54A is being carried by a pedestrian walking on foot. Accordingly, a relatively small search radius may be defined by one or more program 440 so that information sources 721, 722 within a determined walking distance may be displayed by the mobile device 54A, while information sources 710, 711, 730, 731 (for example) outside the defined search radius may be excluded from display. Information sources outside the determined walking distance may be excluded so that a pedestrian running one or more program 440, 441 on wireless communication apparatus 54A does not receive data from information sources that are likely irrelevant (e.g., too far to walk to within a reasonable time). As well, information sources that lie in the direction of motion 721 may be determined by one or more program 550 to have a high relevancy score, and display higher in a list of information sources, than information sources 722 that lie in a direction opposite or away from the direction of motion.

Another example of a wireless communication apparatus may be a mobile device in a vehicle 54N, such as a mobile phone carried in, or a GPS device connected to, vehicle 54N. Motion information for mobile device 54N may include a relatively high speed, a direction of motion, and a relatively high average speed. The high speed and relatively high average speed may indicate that the wireless communication apparatus is in or connected to a vehicle. Accordingly, a relatively large search radius may be defined by one or more program 440 for wireless communication apparatus 54N, so that information sources 710, 711, 721, 722, 731 within a defined driving distance may be displayed by the mobile device 54N, while information sources 730 outside the defined search radius may be excluded from display. As well, information sources lie in the direction of motion 710 (for example) may be determined by one or more program 440 to have a high relevancy score, and display higher in a list of information sources, than information sources 711 that lie in a direction opposite the direction of motion of wireless communication apparatus 54N.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed. It will be further understood that the term "based on" is intended to include both "based on in part" and "based on entirely" or "entirely based on."

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
a computing node external to a wireless communication apparatus in response to a data push received from the wireless communication apparatus requesting information for a plurality of information sources from a plurality of remote computing nodes that are external to the computing node and the wireless communication apparatus, wherein data of the data push that is pushed from the wireless communication apparatus to the computing node external to the wireless communication apparatus includes each of speed information of the wireless communication apparatus, direction information of the wireless communication apparatus, pattern information of the wireless communication apparatus and location information of the wireless communication apparatus, wherein the wireless communication apparatus is a moving wireless communication apparatus;
the computing node external to a wireless communication apparatus receiving from the plurality of remote computing nodes data sets sent by the plurality of remote computing nodes to the computing node in response to the requesting information for a plurality of information sources, wherein the data sets include information sources data comprising enterprise venue website links and data of enterprise venue promotions of the respective information sources;
the computing node external to the wireless communication apparatus in response to the data push from the wireless communication apparatus and in response to the receiving from the plurality of remote computing nodes data sets performs organizing data of the data set;
wherein the organizing data of the data set by the computing node external to the wireless communication apparatus includes the wireless communication apparatus determining a relevancy score for the data of the information sources data using each of the pushed speed information of the wireless communication apparatus pushed from the wireless communication apparatus to the computing node, the pushed direction information of the wireless communication apparatus pushed from the wireless communication apparatus to the computing and the pushed location information of the wireless communication apparatus pushed from the wireless communication apparatus to the computing node, wherein the organizing by the computing node external to the wireless communication apparatus includes the computing node external to the wireless communication apparatus determining based on the determined relevancy scores for the data of the information sources data a sort order list for the data of the information sources data for display of a list of data of the information sources data according to the sort order;

wherein the organizing data of the data set by the computing node external to the wireless communication apparatus includes organizing the data of the information sources data including the data of venue enterprise website links and the data of the enterprise venue promotions for display based on the relevancy scores and the sort order list as determined using each of the pushed speed information of the wireless communication apparatus pushed from the wireless communication apparatus to the computing node, the pushed direction information of the wireless communication apparatus pushed by the wireless communication apparatus to the computing node, and the pushed location information of the wireless communication apparatus pushed by the wireless communication apparatus to the computing node;

the computing node external to the wireless communication apparatus in response to the data push from the wireless communication apparatus establishing a search radius and excluding from the sort order list data from information sources that are external to the search radius, wherein the computing node external to the wireless communication apparatus establishes the search radius using each of the pushed speed information the wireless communication apparatus pushed by the wireless communication apparatus to the computing node, the pushed direction information of the wireless communication apparatus pushed by the wireless communication apparatus to the computing node, the pushed pattern information of the wireless communication apparatus pushed by the wireless communication apparatus to the computing node, and the pushed location information of the wireless communication apparatus pushed by the wireless communication apparatus to the computing node; and the computing node external to the wireless communication apparatus in response to the data push from the wireless communication apparatus sending to the wireless communication apparatus data resulting from the organizing and the establishing, wherein the data resulting from the organizing and the excluding comprises data of the information sources data, wherein the data of the information sources data includes data of the venue enterprise website links and data of the venue enterprise promotions, wherein the sending to the wireless communication apparatus data resulting from the organizing and the establishing facilitates presentment of the data of the information sources data according to the sort order list determined by the computing node.

2. The method of claim 1, wherein the wireless communication apparatus is adapted to be carried by a walking pedestrian user and wherein the wireless communication apparatus is also adapted to be disposed internal to a vehicle, wherein the method includes the computing node external to the wireless communication apparatus responsive to the data push determining using each of the pushed speed information pushed from the wireless communication apparatus and the pushed pattern information pushed from the wireless communication apparatus that the wireless communication apparatus is being carried at a relatively lower speed indicative of a walking speed and according to a pattern indicative of walking when the wireless communication apparatus is being carried by a walking pedestrian user, wherein the method includes the computing node external to the wireless communication apparatus determining using the pushed speed information pushed from the wireless communication apparatus that the wireless communication apparatus is being moved at a relatively higher speed indicative of a vehicle speed when the wireless communication apparatus is disposed in a moving vehicle, wherein the method includes the computing node external to the wireless communication apparatus applying a first scoring function for determining a relevancy score for the information sources based on determining using the pushed speed information that the wireless communication apparatus is being carried at a relatively lower speed indicative of a walking speed, and the computing node external to the wireless communication apparatus applying a second scoring function for determining a relevancy score for the information sources based on the determining using the pushed speed information pushed from the wireless communication apparatus that the wireless communication apparatus is being moved at a relatively higher speed indicative of a vehicle speed when the wireless communication apparatus is disposed in a moving vehicle, the second scoring function being different than the first scoring function, the computing node external to the wireless communication apparatus determining the sort order list for the data of the information sources data differently in dependence on whether the first scoring function or the second scoring function is active.

3. The method of claim 1, wherein the computing node external to a wireless communication apparatus performs in response to the data push classification of the wireless communication apparatus as moving by walking or moving by vehicle transport using the data of the data push, wherein for classifying the wireless communication apparatus as moving by walking the computing node external to a wireless communication apparatus uses each of the speed information and the pattern information pushed from the wireless communication apparatus to the computing node, wherein for classifying the wireless communication apparatus as moving at a vehicle speed the computing node external to a wireless communication apparatus uses each of the speed information and the direction information pushed from the wireless communication apparatus to the computing node, wherein based on a classification of the wireless communication apparatus as moving by vehicle transport the computing node external to a wireless communication apparatus establishes both (a) a scoring function for determining the relevancy score the data of the information sources data to determine an order of the sort order list for the data of the information sources data and (b) the search radius for use in excluding from the sort order list data from information sources external to the search radius.

4. The method of claim 1, wherein the wireless communication apparatus is adapted to be carried by a walking pedestrian user and wherein the wireless communication apparatus is also adapted to be disposed internal to a vehicle, wherein the method includes the computing node external to the wireless communication apparatus responsive to the data push determining using the pushed speed information pushed from the wireless communication apparatus and the pushed pattern information pushed from the wireless communication apparatus that the wireless communication apparatus is being carried at a relatively lower speed indicative of a walking speed and according to a pattern indicative of walking when the wireless communication apparatus is being carried by a walking pedestrian user, wherein the method includes the computing node external to the wireless communication apparatus determining using the pushed speed information pushed from the wireless communication apparatus that the wireless communication apparatus is being moved at a relatively higher speed indicative of a vehicle speed when the wireless communication apparatus is disposed in a moving vehicle, wherein the method includes the computing node external to the wireless communication apparatus applying a first scoring function for determining a relevancy score for the information sources based on determining using the pushed speed information pushed from the wireless communication apparatus that the wireless communication apparatus is being carried at a relatively lower speed indicative of a walking speed, and the computing node external to the wireless communication apparatus applying a second scoring function for determining a relevancy score for the information sources based on the determining using the pushed speed information pushed from the wireless communication apparatus that the wireless communication apparatus is being moved at a relatively higher speed indicative of a vehicle speed when the wireless communication apparatus is disposed in a moving vehicle, the second scoring function being different than the first scoring function, wherein according to the first scoring function a first information source about to be passed that is closer in distance to the wireless communication apparatus forward of a travel direction of the wireless communication apparatus is given a higher relevancy score than a second wireless communication apparatus forward of a travel direction of the wireless communication apparatus farther away from the wireless communication apparatus than the first information source, wherein according to the second scoring function a first information source about to be passed that is closer in distance to the wireless communication apparatus forward of a travel direction of the wireless communication apparatus is given a lower relevancy score than a second wireless communication apparatus forward of a travel direction of the wireless communication apparatus farther away from the wireless communication apparatus than the first information source.

5. The method of claim 1, wherein the wireless communication apparatus is adapted to be carried by a walking pedestrian user and wherein the wireless communication apparatus is also adapted to be disposed internal to a vehicle, wherein the method includes the computing node external to the wireless communication apparatus responsive to the data push determining using the pushed speed information pushed from the wireless communication apparatus and the pushed pattern information that the wireless communication apparatus is being carried at a relatively lower speed indicative of a walking speed and according to a pattern indicative of walking when the wireless communication apparatus is being carried by a walking pedestrian user, wherein the method includes determining using the pushed speed information pushed from the wireless communication apparatus that the wireless communication apparatus is being moved at a relatively higher speed indicative of a vehicle speed when the wireless communication apparatus is disposed in a moving vehicle, wherein the computing node external to the wireless communication based on the determining that the wireless communication apparatus is being moved at a relatively lower speed indicative of a walking speed and according to a pattern indicative of walking includes in the sort order list determined by the computing node data of information sources that have been passed by the wireless communication apparatus, wherein the computing node external to the wireless communication based on the determining that that the wireless communication apparatus is being moved at a relatively higher speed indicative of a vehicle speed excludes from the sort order list determined by the computing node data of information sources that have been passed, wherein the speed information includes information of one or more of speed or average speed of the wireless communication apparatus.

6. The method of claim 1, wherein the method includes the computing node external from the wireless communication apparatus applying a scoring function for determining a relevancy score for the information sources so that data of a first information source that is forward of the wireless communication apparatus in the direction of travel and is closer to the wireless communication apparatus than a second information source is given by the computing node external from the wireless communication apparatus a lower relevancy score than data of the second information source based on a determination that the first information source is forward of the wireless communication apparatus in the direction of travel but is about to be passed, wherein the method includes determining the sort order for data of the first and second information sources using the determined relevancy scores for the first information source and the second information source, wherein according to the scoring function the relevancy score of the first information source forward of the wireless communication apparatus in a direction of travel is lowered prior to being passed based on being determined to have the characteristic of being about to be passed.

7. The method of claim 1, wherein the method includes iteratively receiving the data push from the wireless communication apparatus, wherein the method includes the computing node external to the wireless communication apparatus iteratively performing the requesting, the receiving the data sets having the website links, the organizing, the establishing and the sending in response to the iteratively received data push.

8. The method of claim 1, wherein the data push is a manually initiated data push initiated by user action of a user using the wireless communication apparatus, wherein the computing node external to the wireless communication apparatus performs the requesting, the receiving the data sets, the organizing, the establishing and the sending in response to the manually initiated data push.

9. The method of claim 1, wherein each of the pushed speed information pushed from the wireless communication apparatus, the pushed direction information pushed from the wireless communication apparatus, and the pushed pattern information pushed form the wireless communication apparatus are data values determined by the wireless communications apparatus using values for location of the wireless communication apparatus over time.

10. The method of claim 1, wherein the method includes receiving from the wireless communication apparatus traffic information from the wireless communication apparatus as part of the data push from the wireless communication apparatus received by the computing node, the traffic information being information of traffic at the current location of the wireless communication apparatus, wherein the method includes the computing node external from the wireless communication apparatus using the traffic information to establish the search radius, wherein the search radius established by the computing node external to the wireless communication apparatus is smaller when there is a larger amount of traffic at the current location of the wireless communication apparatus.

11. The method of claim 1, wherein the wireless communication apparatus is adapted to be carried by a walking pedestrian user and wherein the wireless communication is adapted to be disposed internal to a vehicle, wherein the method includes determining that the wireless communication apparatus is being carried at a relatively lower speed indicative of a walking speed when the wireless communication apparatus is being carried by a walking pedestrian user, wherein the method includes determining that the wireless communication apparatus is being moved at a relatively higher speed indicative of a vehicle speed when the wireless communication apparatus is disposed in a moving vehicle, wherein the method includes defining a search radius, and wherein organizing data of the data set for display further comprises filtering the data set from the one or more information sources to exclude data from information sources outside the defined search radius, wherein the defining a search radius includes defining a relatively smaller radius when the wireless communication apparatus is determined to be traveling at the relatively lower speed, wherein the defining a search radius includes defining a relatively larger radius when the wireless communication apparatus is determined to be traveling at the relatively higher speed.

12. A method comprising:
a computing node external to a wireless communication apparatus iteratively sending data requests to the wireless communication apparatus, the wireless communication apparatus being a moving wireless communication apparatus, the iteratively sent data requests requesting speed information of the wireless communication apparatus, direction information of the wireless communication apparatus pattern information of the wireless communication apparatus and location information of the wireless communication apparatus;
the computing node external to the wireless communication apparatus iteratively receiving data from the wireless communication apparatus in response the iteratively sent data requests to the wireless communication apparatus from the computing node, wherein the iteratively receiving data includes iteratively receiving speed information of the wireless communication apparatus, direction information of the wireless communication apparatus pattern information of the wireless communication apparatus and location information of the wireless communication apparatus;
the computing node external to a wireless communication apparatus with the iteratively sending data requests iteratively sending data set requests to remote computing nodes that are external to the computing node and the wireless communication apparatus;
the computing node external to the wireless communication apparatus iteratively receiving data sets from the remote computing nodes in response to the iteratively sent data set requests, wherein the iteratively receiving data sets includes iteratively receiving information sources data comprising data of enterprise venue website links and data of enterprise venue promotions of the respective information sources;
the computing node external to the wireless communication apparatus in response to the iteratively receiving data from the wireless communication apparatus and in response to the iteratively receiving from the remote computing nodes data sets performing organizing data of the data set;
wherein the organizing of the data set by the computing node external to the wireless communication apparatus includes the wireless communication apparatus determining a relevancy score for data of the information sources data using each of the speed information of the wireless communication apparatus iteratively received from the wireless communication apparatus by the computing node, the direction information of the wireless communication apparatus iteratively received from the wireless communication apparatus to the computing and the location information of the wireless communication apparatus iteratively received from the wireless communication apparatus computing node external to the wireless communication apparatus, wherein the organizing by the computing node external to the wireless communication apparatus includes, the computing node external to the wireless communication apparatus determining based on the determined relevancy scores for the data of the information sources data a sort order list for the data of the information sources data for display of a list of data of the information sources data according to the sort order;
wherein the organizing data of the data set by the computing node external to the wireless communication apparatus includes organizing the data of the information sources data including the data of venue enterprise website links and the data of the enterprise venue promotions for display based on the relevancy scores and the sort order as determined using each of the iteratively received speed information the wireless communication apparatus iteratively sent by the wireless communication apparatus in response to the iteratively sending data requests, the iteratively received direction information of the wireless communication apparatus iteratively sent by the wireless communication apparatus to the computing node, and the iteratively received location information of the wireless communication apparatus iteratively sent by the wireless communication apparatus;
the computing node external to the wireless communication apparatus in response to the iteratively received data from the wireless communication apparatus received in response to the iteratively sent data requests to the wireless communication apparatus iteratively establishing a search radius and excluding from the sort order list data from information sources that are external to the search radius, wherein the computing node external to the wireless communication apparatus established the search radius using each of the iteratively received speed information the wireless communication apparatus iteratively sent by the wireless communication apparatus, the iteratively received pattern information of the wireless communication apparatus iteratively sent by the wireless communication apparatus, the iteratively received pattern information of the wireless communication apparatus iteratively sent by the wireless communication apparatus, and also the iteratively received location information of the wireless communication apparatus iteratively sent by the wireless communication apparatus; and the computing node external to the wireless communication apparatus iteratively sending to the wireless communication apparatus data resulting from the organizing and the establishing, wherein the data resulting from the organizing and the establishing comprises data of the information sources data including data of the venue enterprise website links and data of the venue enterprise promotions, wherein the computing node external to the wireless communication apparatus iteratively sending to the wireless communication apparatus data resulting from the organizing and the establishing facilitates presentment of the data of the information sources data according to the sort order list determined by the computing node.

13. The method of claim 12, wherein the wireless communication apparatus is adapted to be carried by a walking pedestrian user and wherein the wireless communication apparatus is also adapted to be disposed internal to a vehicle, wherein the method includes the computing node external to the wireless communication apparatus responsive to the iteratively receiving data from the wireless communication apparatus determining using the iteratively received speed information and the iteratively received pattern information iteratively received from the wireless communication apparatus that the wireless communication apparatus is being carried at a relatively lower speed indicative of a walking speed and according to a pattern indicative of walking when the wireless communication apparatus is being carried by a walking pedestrian user, wherein the method includes the computing node external to the wireless communication apparatus determining using the iteratively received speed information that the wireless communication apparatus is being moved at a relatively higher speed indicative of a vehicle speed when the wireless communication apparatus is disposed in a moving vehicle, wherein the method includes the computing node external to the wireless communication apparatus applying a first scoring function for determining a relevancy score for the information sources based on determining using the iteratively received speed information that the wireless communication apparatus is being carried at a relatively lower speed indicative of a walking speed, and the computing node external to the wireless communication apparatus applying a second scoring function for determining a relevancy score for the information sources based on the determining using the iteratively received speed information that the wireless communication apparatus is being moved at a relatively higher speed indicative of a vehicle speed when the wireless communication apparatus is disposed in a moving vehicle, the second scoring function being different than the first scoring function, the computing node external to the wireless communication apparatus determining the sort order list for the data of the information sources data differently in dependence on whether the first scoring function or the second scoring function is active.

14. The method of claim 12, wherein the computing node external to a wireless communication apparatus performs in response to the iteratively receiving data performs classification of the wireless communication apparatus as moving by walking or moving by vehicle transport using the data of the iteratively received data, wherein for classifying the wireless communication apparatus as moving at a pedestrian speed the computing node external to a wireless communication apparatus uses each of the speed information and the pattern information iteratively received from the wireless communication apparatus to the computing node, wherein for classifying the wireless communication apparatus as moving at a vehicle speed the computing node external to a wireless communication apparatus uses each of the speed information and the direction information iteratively received from the wireless communication apparatus to the computing node, wherein based on a classification of the wireless communication apparatus as moving by vehicle transport the computing node external to a wireless communication apparatus establishes both (a) a scoring function for determining the relevancy score the data of the information sources data for determining an order of the sort order list for the data of the information sources data and (b) the search radius for use in excluding from the sort order list data from information sources external to the search radius, wherein based on a classification of the wireless communication apparatus as moving by walking the computing node external to the wireless communication apparatus establishes the search radius so that data of information sources are excluded from the sort order list for the data of the information sources data unless they can be walked to within a reasonable time.

15. The method of claim 12, wherein the wireless communication apparatus is adapted to be carried by a walking pedestrian user and wherein the wireless communication apparatus is also adapted to be disposed internal to a vehicle, wherein the method includes the computing node external to the wireless communication apparatus responsive to the iteratively receiving data determining using the iteratively received speed information and the iteratively received pattern information iteratively received from the wireless communication apparatus that the wireless communication apparatus is being carried at a relatively lower speed indicative of a walking speed and according to a pattern indicative of walking when the wireless communication apparatus is being carried by a walking pedestrian user, wherein the method includes the computing node external to the wireless communication apparatus determining using the iteratively received speed information that the wireless communication apparatus is being moved at a relatively higher speed indicative of a vehicle speed when the wireless communication apparatus is disposed in a moving vehicle, wherein the method includes the computing node external to the wireless communication apparatus applying a first scoring function for determining a relevancy score for the information sources based on determining using the iteratively received speed information that the wireless communication apparatus is being carried at a relatively lower speed indicative of a walking speed, and the computing node external to the wireless communication apparatus applying a second scoring function for determining a relevancy score for the information sources based on the determining using the iteratively received speed information that the wireless communication apparatus is being moved at a relatively higher speed indicative of a vehicle speed when the wireless communication apparatus is disposed in a moving vehicle, the second scoring function being different than the first scoring function, wherein according to the first scoring function a first information source about to be passed that is closer in distance to the wireless communication apparatus forward of a travel direction of the wireless communication apparatus is given a higher relevancy score than a second wireless communication apparatus forward of a travel direction of the wireless communication farther away from the wireless communication apparatus than the first information source, wherein according to the second scoring function a first information source about to be passed that is closer in distance to the wireless communication apparatus forward of a travel direction of the wireless communication apparatus is given a lower relevancy score than a second wireless communication apparatus forward of a travel direction of the wireless communication farther away from the wireless communication apparatus than the first information source.

16. The method of claim 12, wherein the wireless communication apparatus is adapted to be carried by a walking pedestrian user and wherein the wireless communication apparatus is also adapted to be disposed internal to a vehicle, wherein the method includes the computing node external to the wireless communication apparatus responsive to the iteratively receiving data determining using the iteratively received speed information and the iteratively received pattern information that the wireless communication apparatus is being carried at a relatively lower speed indicative of a walking speed and according to a pattern indicative of walking when the wireless communication apparatus is being carried by a walking pedestrian user, wherein the method includes determining using the iteratively received speed information that the wireless communication apparatus is being moved at a relatively higher speed indicative of a vehicle speed when the wireless communication apparatus is disposed in a moving vehicle, wherein the computing node external to the wireless communication based on the determining that the wireless communication apparatus is being moved at a relatively lower speed indicative of a walking speed and according to a pattern indicative of walking includes in the sort order list determined by the computing node external to the wireless communication apparatus data of information sources that have been passed, wherein the computing node external to the wireless communication based on a determining by the computing node external to the wireless communication apparatus that the wireless communication apparatus is being moved at a relatively higher speed indicative of a vehicle speed excludes from the sort order list determined by the computing node data of information sources that have been passed by the wireless communication apparatus, wherein the method includes defining a search radius, and wherein organizing data of the data set for display further comprises filtering the data set from the one or more information sources to exclude data from information sources outside the defined search radius, wherein the defining a search radius includes defining a relatively smaller radius when the wireless communication apparatus is determined to be traveling at the relatively lower speed, wherein the defining a search radius includes defining a relatively larger radius when the wireless communication apparatus is determined to be traveling at the relatively higher speed, wherein the defining a relatively smaller radius includes the computing node external from the wireless communication apparatus establishing the relatively smaller radius based on the ability of the user of the wireless communication apparatus to walk to an edge of the search radius.

17. The method of claim 12, wherein the method includes the computing node external from the wireless communication apparatus applying a scoring function for determining a relevancy score for the information sources so that data of a first information source that is forward of the wireless communication apparatus in the direction of travel and is closer to the wireless communication apparatus than a second information source is given by the computing node external from the wireless communication apparatus a lower relevancy score than data of the second information source based on a determination that the first information source is forward of the wireless communication apparatus in the direction of travel but is about to be passed, wherein the method includes determining the sort order for data of the first and second information sources using the determined relevancy scores for the first information source and the second information source, wherein according to the scoring function the relevancy score of the first information source forward of the wireless communication apparatus in a direction of travel is lowered prior to being passed based on being determined by the computing node external from the wireless communication apparatus to have the characteristic of being about to be passed.

18. The method of claim 12, wherein each of the iteratively received speed information of the wireless communication apparatus, direction information of the wireless communication apparatus, and pattern information of the wireless communication apparatus are data values determined by the wireless communications apparatus using values for location of the wireless communication apparatus over time.

19. The method of claim 12, wherein iteratively receiving includes iteratively receiving from the wireless communication apparatus traffic information, the traffic information being information of traffic at the current location of the wireless communication apparatus, wherein the method includes the computing node external from the wireless communication apparatus using the traffic information to establish the search radius, wherein the search radius established by the computing node external to the wireless communication apparatus is smaller when there is a larger amount of traffic at the current location of the wireless communication apparatus.

20. A system comprising:
a memory;
one or more processing apparatus in communication with the memory;
a computer readable storage medium; and
one or more program comprising program instructions stored on the computer readable storage medium and executable by the one or more processing apparatus via the memory to perform a method, the method comprising:
a computing node external to a wireless communication apparatus in response to a data push received from the wireless communication apparatus requesting information for a plurality of information sources from a plurality of remote computing nodes that are external to the computing node and the wireless communication apparatus, wherein data of the data push that is pushed from the wireless communication apparatus to the computing node external to the wireless communication apparatus includes each of speed information of the wireless communication apparatus, direction information of the wireless communication apparatus, pattern information of the wireless communication apparatus and location information of the wireless communication apparatus;
the computing node external to a wireless communication apparatus receiving from the plurality of remote computing nodes data sets sent by the plurality of remote computing nodes to the computing node in response to the requesting information, wherein the data sets include information sources data comprising enterprise venue website links and data of enterprise venue promotions of the respective information sources;
the computing node external to the wireless communication apparatus in response to the data push from the wireless communication apparatus and in response to the receiving from the plurality of remote computing nodes data sets performs organizing data of the data set;

wherein the organizing of the data set by the computing node external to the wireless communication apparatus includes the wireless communication apparatus determining a relevancy score for data of the information sources data using each of the speed information of the wireless communication apparatus pushed from the wireless communication apparatus to the computing node, the direction information of the wireless communication apparatus pushed from the wireless communication apparatus to the computing and the location information of the wireless communication apparatus pushed from the wireless communication apparatus computing node external to the wireless communication apparatus, wherein the organizing by the computing node external to the wireless communication apparatus includes, the computing node external to the wireless communication apparatus determining based on the determined relevancy scores for the data of the information sources data a sort order list for the data of the information sources data for display of a list of data of the information sources data according to the sort order;

wherein the organizing data of the data set by the computing node external to the wireless communication apparatus includes organizing the data of the information sources data including the data of venue enterprise website links and the data of the enterprise venue promotions for display based on the relevancy scores and the sort order list as determined using each of the pushed speed information the wireless communication apparatus pushed by the wireless communication apparatus, the pushed direction information of the wireless communication apparatus pushed by the wireless communication apparatus to the computing node, and the pushed location information of the wireless communication apparatus pushed by the wireless communication apparatus;

the computing node external to the wireless communication apparatus in response to the data push from the wireless communication apparatus establishing a search radius and excluding from the sort order list data from information sources that are external to the search radius, wherein the computing node external to the wireless communication apparatus establishes the search radius using each of the pushed speed information the wireless communication apparatus pushed by the wireless communication apparatus, the pushed direction information of the wireless communication apparatus pushed by the wireless communication apparatus, the pushed pattern information of the wireless communication apparatus pushed by the wireless communication apparatus, and the pushed location information of the wireless communication apparatus pushed by the wireless communication apparatus;

the computing node external to the wireless communication apparatus in response to the data push from the wireless communication apparatus sending to the wireless communication apparatus data resulting from the organizing and the establishing, wherein the data resulting from the organizing and the excluding comprises data of the information sources data, wherein the data of the information sources data includes data of the venue enterprise website links and data of the venue enterprise promotions, wherein the sending to the wireless communication apparatus data resulting from the organizing and the establishing facilitates presentment of the data of the information sources data according to the sort order list determined by the computing node;

wherein the computing node external to a wireless communication apparatus performs in response to the data push performs classification of the wireless communication apparatus as moving by walking or moving by vehicle transport using the data of the data push, wherein for classifying the wireless communication apparatus as moving by walking the computing node external to a wireless communication apparatus uses each of the speed information pushed by the wireless communication apparatus and the pattern information pushed from the wireless communication apparatus to the computing node, wherein for classifying the wireless communication apparatus as moving at a vehicle speed the computing node external to a wireless communication apparatus uses each of the speed information and the direction information pushed from the wireless communication apparatus to the computing node, wherein based on a classification of the wireless communication apparatus as moving by vehicle transport the computing node external to a wireless communication apparatus establishes both (a) a scoring function for determining the relevancy score the data of the information sources data for determining an order of the sort order list for the data of the information sources data and (b) the search radius for use in excluding from the sort order list data from information sources external to the search radius;

wherein the method includes receiving from the wireless communication apparatus traffic information from the wireless communication apparatus as part of the data push from the wireless communication apparatus received by the computing node, the traffic information being information of traffic at the current location of the wireless communication apparatus, wherein the method includes the computing node external from the wireless communication apparatus using the traffic information to establish the search radius, wherein the search radius established by the computing node external to the wireless communication apparatus is smaller when there is a larger amount of traffic at the current location of the wireless communication apparatus; and wherein each of the pushed speed information pushed from the wireless communication apparatus, the pushed direction information pushed from the wireless communication apparatus, and the pushed pattern information pushed form the wireless communication apparatus are data values calculated by the wireless communications apparatus using changing values for location of the wireless communication apparatus over time.

\* \* \* \* \*